(12) United States Patent
Nojima

(10) Patent No.: US 11,940,720 B2
(45) Date of Patent: Mar. 26, 2024

(54) OPTICAL SYSTEM AND IMAGE PROJECTION APPARATUS

(71) Applicant: Kei Nojima, Tokyo (JP)

(72) Inventor: Kei Nojima, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/772,140

(22) PCT Filed: Nov. 10, 2020

(86) PCT No.: PCT/IB2020/060546
§ 371 (c)(1),
(2) Date: Apr. 27, 2022

(87) PCT Pub. No.: WO2021/099884
PCT Pub. Date: May 27, 2021

(65) Prior Publication Data
US 2022/0397814 A1 Dec. 15, 2022

(30) Foreign Application Priority Data
Nov. 21, 2019 (JP) ................. 2019-210143

(51) Int. Cl.
*G03B 21/20* (2006.01)
*G03B 21/00* (2006.01)

(52) U.S. Cl.
CPC ....... *G03B 21/2046* (2013.01); *G03B 21/008* (2013.01); *G03B 21/2066* (2013.01)

(58) Field of Classification Search
CPC ............. G03B 21/2046; G03B 21/008; G03B 21/2066; G03B 21/00; G03B 21/2013;
(Continued)

(56) References Cited

U.S. PATENT DOCUMENTS

2003/0202259 A1* 10/2003 Nishimae ............. H04N 9/3152
348/E5.142
2004/0027681 A1 2/2004 Sunagawa et al.
(Continued)

FOREIGN PATENT DOCUMENTS

CN 102540661 A 7/2012
JP WO 99/049505 A1 9/1999
(Continued)

OTHER PUBLICATIONS

International Search Report dated Jan. 29, 2021 in PCT/IB2020/060546 filed on Nov. 10, 2020, 9 pages.
(Continued)

*Primary Examiner* — Magda Cruz
(74) *Attorney, Agent, or Firm* — XSENSUS LLP

(57) ABSTRACT

An optical system (300) includes an optical modulation element (103) to reflect an incident light (250) in a different direction, and an illumination optical system (301) through which light emitted from a light source (101) is emitted toward the optical modulation element (103). The illumination optical system (301) includes a lens array (14A, 14B), a lens (15) disposed in an order listed from an upstream side of an optical path, and a shielding part (50) disposed upstream from the lens (15) on the optical path. The shielding part (50) shields light incident on an effective diameter of the lens (15). In a direction perpendicular to an optical axis of the light emitted from the light source (101), the optical axis (101A) is shifted from a center position (15M) of the effective diameter of the lens (15) in an opposite direction with reference to the shielding part (50).

12 Claims, 3 Drawing Sheets

(58) Field of Classification Search
CPC .. G02B 5/003; G02B 27/0101; G02B 3/0006; H04N 9/3105; H04N 9/3152; H04N 9/3164
See application file for complete search history.

(56) References Cited

U.S. PATENT DOCUMENTS

| | | | |
|---|---|---|---|
| 2005/0140933 A1 | 6/2005 | Cannon et al. | |
| 2006/0072074 A1* | 4/2006 | Matsui | H04N 5/7416 353/20 |
| 2008/0036973 A1* | 2/2008 | Kojima | H04N 9/315 353/38 |
| 2011/0141439 A1 | 6/2011 | Yamauchi et al. | |
| 2012/0162613 A1 | 6/2012 | Liu et al. | |
| 2015/0277215 A1* | 10/2015 | Sudo | G02B 19/0014 353/38 |
| 2016/0037142 A1 | 2/2016 | Nakajima et al. | |
| 2018/0003964 A1* | 1/2018 | Tatsuno | G02B 27/0172 |
| 2019/0230326 A1* | 7/2019 | Sheng | H04N 9/3114 |
| 2020/0137303 A1* | 4/2020 | Ushio | G03B 21/28 |
| 2020/0249580 A1 | 8/2020 | Kono | |
| 2020/0355993 A1* | 11/2020 | Adachi | G03B 21/208 |

FOREIGN PATENT DOCUMENTS

| | | |
|---|---|---|
| JP | 2003-315733 | 11/2003 |
| JP | 2004-62156 A | 2/2004 |
| JP | 2004-191891 | 7/2004 |
| JP | 2005-202366 | 7/2005 |
| JP | 2007-233004 | 9/2007 |
| JP | 2007-294346 | 11/2007 |
| JP | 2011-128205 A | 6/2011 |
| JP | 2015-201433 | 11/2015 |
| JP | 2017-129847 | 7/2017 |
| JP | 2019-78883 A | 5/2019 |
| JP | 2020-187161 | 11/2020 |

OTHER PUBLICATIONS

Chinese Office Action dated Dec. 29, 2023 in corresponding Chinese Patent Application No. CN202080080212.9, 8 pages.

* cited by examiner

OPTICAL SYSTEM AND IMAGE PROJECTION APPARATUS

CROSS-REFERENCE TO RELATED APPLICATIONS

The present application is based on PCT/IB2020/060546 filed on Nov. 10, 2020 and claims priority to JP 2019-210143 filed on Nov. 21, 2019, the entire contents of each are incorporated herein by reference.

TECHNICAL FIELD

Embodiments of the present disclosure relate to an optical system and an image projection apparatus.

BACKGROUND ART

An image display apparatus is known in the art that is provided with an approximately D-shaped aperture that cuts out, as stray light or unnecessary light, the light in an angle domain where the incident light overlaps with the reflection light in an on-direction on a digital micromirror device (DMD) that serves as a reflective modulation element. If the interference region is removed, such an aperture is shaped like "D" (see, for example, PTL 1).

A projection video display that is provided with a wavelength-selective filter that serves as a light-shielding stop is known in the art (see, for example, PTL 2). Such a wavelength-selective filter reflects some of the light emitted from a light source that irradiates an optical modulation element with light. More specifically, the wavelength-selective filter reflects the light of wavelength that is reflected by a flat base layer and then is incident on a port of a projection optical system.

CITATION LIST

Patent Literature

[PTL 1]
Japanese Patent Application Publication No. 2003-315733
[PTL 2]
Japanese Patent Application Publication No. 2005-129847

SUMMARY OF INVENTION

Technical Problem

According to one aspect of the present disclosure, an optical system and an image projection apparatus in which the effect of unnecessary light can be reduced and the utilization efficiency of light can be prevented from deteriorating are to be provided.

Solution to Problem

An optical system includes an optical modulation element configured to reflect and emit an incident light in a different direction, and an illumination optical system through which light emitted from a light source is emitted toward the optical modulation element. The illumination optical system includes a lens array and a lens disposed in an order listed from an upstream side of an optical path. Further, the illumination optical system includes a shielding part disposed upstream from the lens on the optical path, and the shielding part is configured to shield light incident on an effective diameter of the lens. In a direction perpendicular to an optical axis of the light emitted from the light source, the optical axis is shifted from a center position of the effective diameter of the lens in an opposite direction with reference to the shielding part.

Advantageous Effects of Invention

According to one aspect of the present disclosure, an optical system and an image projection apparatus in which the effect of unnecessary light is reduced and the utilization efficiency of light is prevented from deteriorating can be provided.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
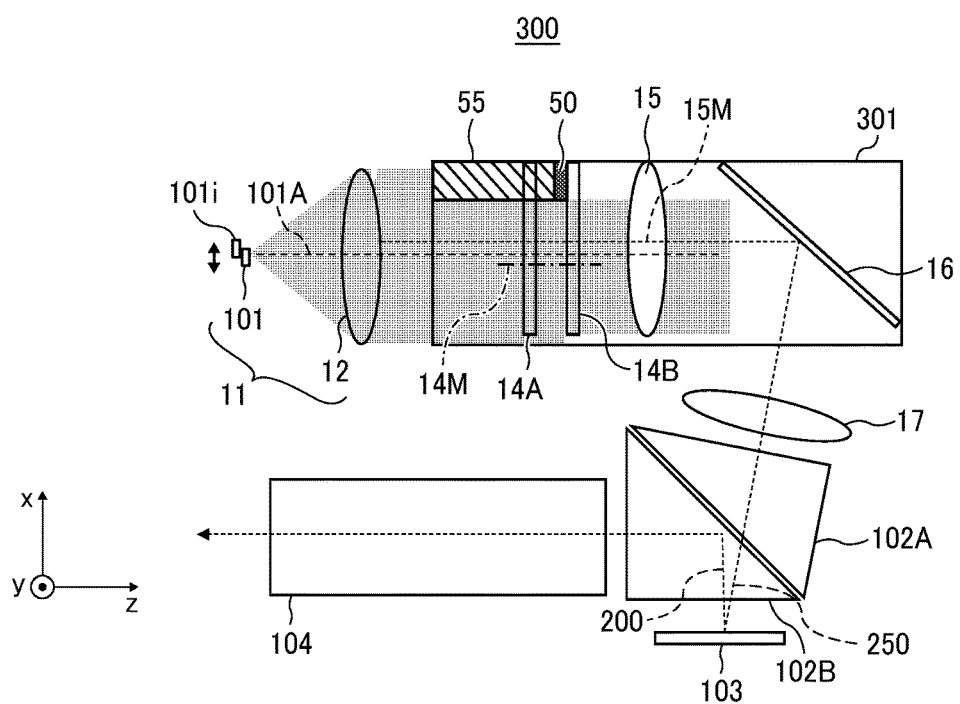
FIG. 1 is a sectional view of an image projection apparatus according to an embodiment of the present disclosure.

FIG. 1 is a sectional view of an image projection apparatus 300 according to an embodiment of the present disclosure.

The image projection apparatus 300 is a front-projecting projector, and projects an image onto a screen.

It is assumed that the image projection apparatus 300 according to the present disclosure is provided for a vehicle. However, no limitation is indicated thereby, and an image projection apparatus according to the present disclosure can be used for various kinds of purposes or devices. For example, an image projection apparatus according to the present disclosure may be mounted on motorbikes or aircraft.

As illustrated in FIG. 1, the image projection apparatus 300 that serves as an optical system includes a light source unit 11, an illumination optical system 301, a field lens 17, a pair of optical elements 102A and 102B, an optical modulation element 103, and a projection optical system 104.

The light source unit 11 is provided with a light source 101 and a collimator lens 12, and the light source 101 includes three colored light sources that correspond to three colors of red (R), blue (B), and green (G) in a one-to-one relationship, and a pair of dichroic mirrors where the wavelengths of the light to be reflected and the wavelengths of the light to be transmitted are determined in advance.

The illumination optical system 301 includes a first fly-eye lens 14A, a second fly-eye lens 14B, a field lens 15, and a mirror 16 that are arranged in the order listed from the upstream side of the optical path so as to be separate from each other, and the incident light 250 that is emitted from the light source 101 guides the illumination light to the optical elements 102A and 102B through the field lens 17.

The first fly-eye lens 14A and the second fly-eye lens 14B are an example of a lens array.

Preferably, each one of the pair of optical elements 102A and 102B is configured by a prism that has at least a pair of planes. In the present embodiment, each one of the pair of optical elements 102A and 102B is configured by a total-reflection triangular prism unit (so-called total internal reflection (TIR) prism unit).

The optical modulation element 103 modulates the incident light 250 based on the image data. The optical modulation element 103 is configured by a digital micromirror device (DMD) that has an approximately rectangular-shaped mirror surface consisting of a plurality of micromirrors, and drives the above multiple micromirrors on a time-division basis based on the input image data.
As a result, the light is processed and reflected so as to achieve an image based on the image data.

In the above configuration, the incident light 250 that is guided by the illumination optical system 301 passes through the pair of optical elements 102A and 102B, and is emitted to the optical modulation element 103 as the incident light 250.

The optical modulation element 103 drives the multiple micromirrors on a time-division basis to switch between a state in which the incident light 250 is to be reflected as a first exit light 200 in a first direction and a state in which the incident light 250 is to be reflected as a second exit light in a second direction that is different from the first direction.

The optical element 102B reflects the first exit light 200 that is reflected by the optical modulation element 103 in the first direction, and transmits the second exit light that is reflected by the optical modulation element 103 in the second direction.

The first exit light 200 that is reflected by the optical element 102B is guided to the projection optical system 104 as an on-light beam that forms an image based on the image data, and the second exit light that is reflected by the optical modulation element 103 in the second direction is dealt with as an off-light beam that does not form any image. As the second exit light is incident on, for example, a structural grain and a light-absorbing band, its further reflection can be prevented.

The projection optical system 104 projects the first exit light 200 onto a screen to form an image based on the received image data. Such a screen is configured by, for example, a microlens array (MLA), and serves as a projection surface.

Figure 3:
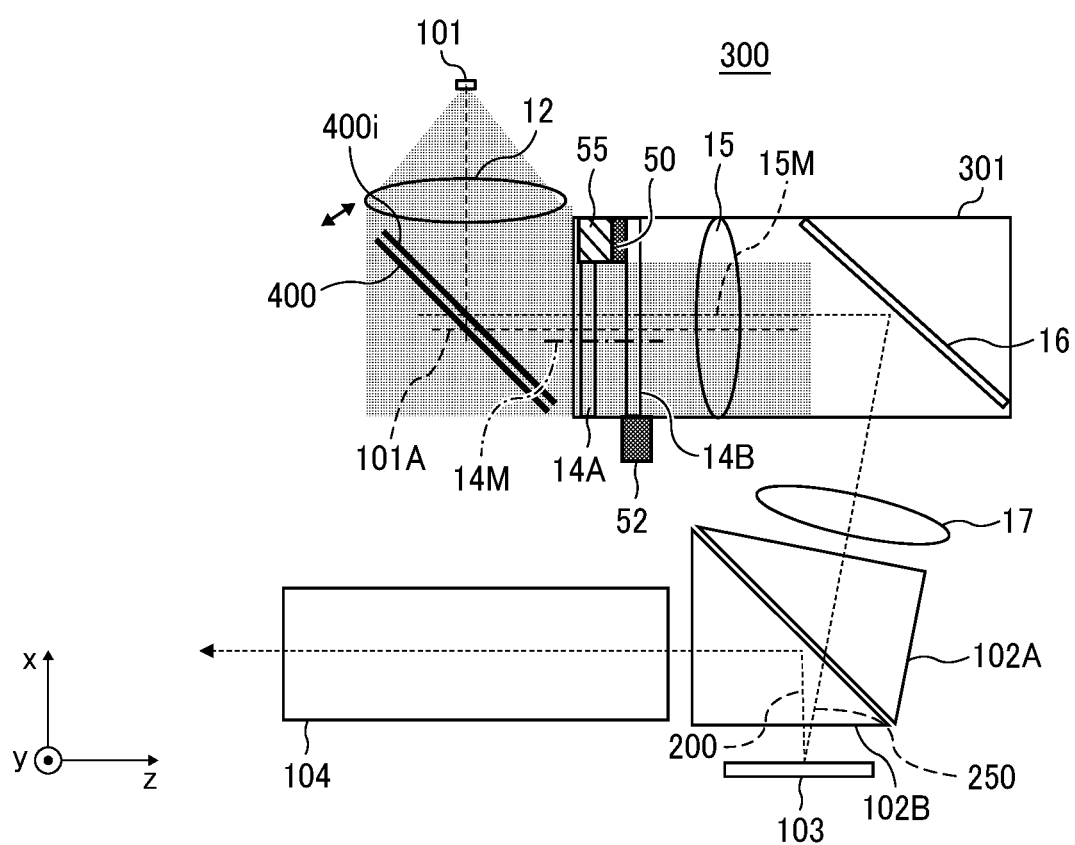
FIG. 3 is a sectional view of the image projection apparatus as illustrated in FIG. 1, according to a modification of the above embodiment of the present disclosure.

In the present embodiment, the image projection apparatus 300 is provided with a shielding part 50 disposed upstream from the second fly-eye lens 14B on the optical path, which is configured to shield the light incident on the effective diameter of the field lens 15, in addition to the configuration or structure as described above. Due to such a configuration, the stray light or unnecessary light that is caused by the light reflected by the surface of the optical modulation element 103 can be reduced. The stray light or unnecessary light that is caused by the light reflected by the surface of the optical modulation element 103 is, for example, the stray light or unnecessary light as illustrated in FIG. 3 and FIG. 5 of PTL 2.

In this configuration, in a direction perpendicular to the optical axis 101A of the light emitted from the light source 101, the center position 14M of the effective diameter of the first fly-eye lens 14A and the second fly-eye lens 14B is displaced from the center position 15M of the effective diameter of the field lens 15 in the opposite direction with reference to the shielding part 50. In the present embodiment, the effective diameter of the first fly-eye lens 14A and the second fly-eye lens 14B indicates the area from which a shielding field 55 in which the light is shielded by the shielding part 50 is removed in a direction perpendicular to the optical axis 101A.

Furthermore, in the present embodiment, the light source unit 11 is configured so as to be movable in a direction perpendicular to the optical axis 101A. When the light source 101 is at an initial position 101i, the optical axis 101A of the light source 101 matches the center position 15M of the effective diameter of the field lens 15. However, when the position of the light source 101 is as illustrated in FIG. 1, the optical axis 101A is misaligned from the center position 15M of the effective diameter of the field lens 15 in the opposite direction with reference to the shielding part 50.

Figure 2:
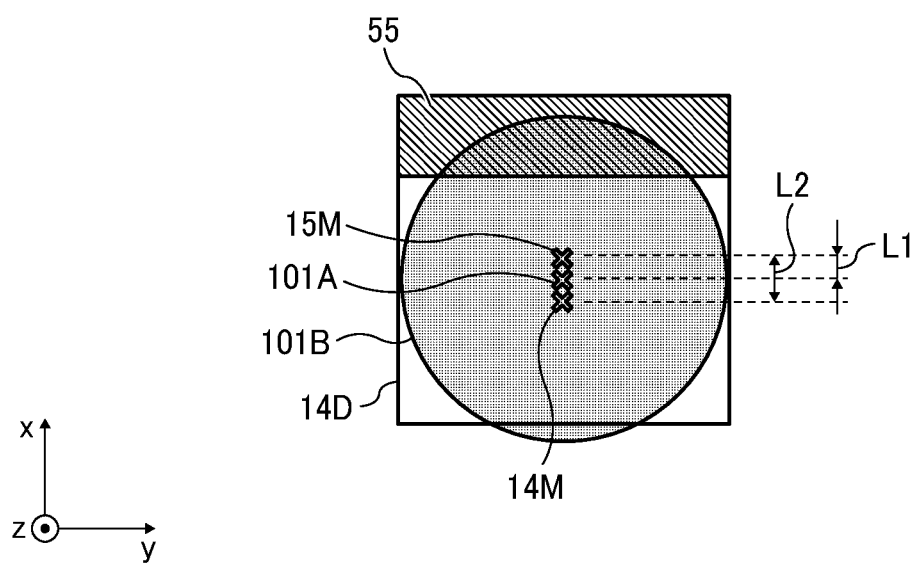
FIG. 2 is a sectional view of the illumination optical system of the image projection apparatus as illustrated in FIG. 1, which is orthogonal to the optical axis.

FIG. 2 is a sectional view of the illumination optical system 301 of the image projection apparatus 300 as illustrated in FIG. 1, which is orthogonal to the optical axis 101A, according to the present embodiment.

As illustrated in FIG. 2, the light that is emitted from the light source 101 has an irradiation field 101B, but some of the light that is emitted from the light source 101 but is obstructed by the shielding field 55 does not reach the field lens 15.

As a result, the utilization efficiency of the light emitted from the light source 101 deteriorates.

In order to handle such a situation, in a direction perpendicular to the optical axis 101A, the optical axis 101A is shifted from the center position 15M of the effective diameter of the field lens 15 in the opposite direction with reference to the shielding part 50. By so doing, the dimension of the irradiation field 101B that overlaps with the shielding field 55 can be reduced, and the utilization efficiency of the light emitted from the light source 101 can be prevented from deteriorating.

However, if the distance L1 between the center position 15M and the optical axis 101A increases to an excessive degree, the dimension of the area of the first irradiation field 101B that goes out of an effective diameter 14D of the second fly-eye lens 14B tends to increase. In view of the above circumstances, the distance L1 between the center position 15M and the optical axis 101A is controlled to be equal to or shorter than twice as much as the distance L2 between the center position 15M and the center position 14M. By so doing, the utilization efficiency of the light emitted from the light source 101 can be prevented from deteriorating in a reliable manner.

Further, the distance L1 between the center position 15M and the optical axis 101A may be controlled to be equal to or shorter than the distance L2 between the center position 15M and the center position 14M. By so doing, the utilization efficiency of the light emitted from the light source 101 can further be prevented from deteriorating.

FIG. 3 is a sectional view of the image projection apparatus 300 as illustrated in FIG. 1, according to a modification of the above embodiment of the present disclosure.

In the present modification of the above embodiment, the image projection apparatus 300 is further provided with a reflection optical system 400 that reflects the light emitted from the light source 101 toward the illumination optical system 301, and the reflection optical system 400 is movable so as to change the distance L1 as illustrated in FIG. 2 in a direction perpendicular to the optical axis 101A.

When the reflection optical system 400 is at an initial position 400i, the optical axis 101A of the light source 101 matches the center position 15M of the effective diameter of the field lens 15. However, when the position of the reflection optical system 400 is as illustrated in FIG. 3, the optical axis 101A is misaligned from the center position 15M of the effective diameter of the field lens 15 in the opposite direction with reference to the shielding part 50.

As described above, the image projection apparatus 300 according to an embodiment of the present disclosure, which serves as an optical system, includes an optical modulation element 103 configured to reflect and emit the incident light 250 in a different direction, and the illumination optical system 301 through which the light that is emitted from the light source 101 is emitted toward the optical modulation element 103. The illumination optical system 301 is provided with the field lens 15, and the first fly-eye lens 14A and the second fly-eye lens 14B, which are disposed from the upstream side of the optical path in the order listed and together serve as a lens array. The illumination optical system 301 is further provided with the shielding part 50 that is disposed upstream from the field lens 15 on the optical path and is configured to shield the light incident on the effective diameter of the field lens 15. Moreover, in a direction perpendicular to the optical axis 101A of the light emitted from the light source 101, the optical axis 101A is misaligned from the center position 15M of the effective diameter of the field lens 15 in the opposite direction with reference to the shielding part 50.

Due to such a configuration, the stray light or unnecessary light that is caused by the light reflected by the surface of the optical modulation element 103 can be reduced, and the utilization efficiency of the light emitted from the light source 101 can be prevented from deteriorating.

In a direction perpendicular to the optical axis 101A, the distance L1 between the optical axis 101A and the center position 15M of the effective diameter of the field lens 15 is controlled to be equal to or shorter than twice as much as the distance L2 between the center position 15M of the effective diameter of the field lens 15 and the center position 14M of the effective diameter of the first fly-eye lens 14A and the second fly-eye lens 14B. Note that the length of shielding field 55 in which the light is shielded by the shielding part 50 is excluded from the effective diameter of the first fly-eye lens 14A and the second fly-eye lens 14B.

Further, the distance L1 may be controlled to be equal to or shorter than the distance L2. By so doing, the utilization efficiency of the light emitted from the light source 101 can be prevented from deteriorating in a reliable manner.

In the above embodiment of the present disclosure, the light source 101 is movable such that the distance L1 between the optical axis 101A and the center position 15M of the effective diameter of the field lens 15 changes in a direction perpendicular to the optical axis 101A.

Alternatively, the image projection apparatus 300 may further be provided with the reflection optical system 400 that reflects the light emitted from the light source 101 toward the illumination optical system 301, and the reflection optical system 400 may move such that the distance L1 between the optical axis 101A and the center position 15M of the effective diameter of the field lens 15 changes in a direction perpendicular to the optical axis 101A.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. For example, some of the elements described in the above embodiments may be removed. Further, elements according to varying embodiments or modifications may be combined as appropriate.

This patent application is based on and claims priority to Japanese Patent Application No. 2019-210143, filed on Nov. 21, 2019, in the Japan Patent Office, the entire disclosures of which are hereby incorporated by reference herein.

REFERENCE SIGNS LIST

11 Light source unit
12 Collimator lens
14A First fly-eye lens (lens array)
14B Second fly-eye lens (lens array)
14D Effective diameter of fly-eye lens
14M Center position of effective diameter of fly-eye lens
15 Field lens
15M Center position of effective diameter of filed lens
50 Shielding part
55 Shielding field
101 Light source
101A Optical axis
101B Irradiation field
101i Initial position
103 Optical modulation element
104 Projection optical system
200 First exit light
250 Incident light (irradiation light)
300 Image projection apparatus (optical system)
301 Illumination optical system
400 Reflection optical system

The invention claimed is:

1. An optical system comprising:
an optical modulation element to reflect and emit an incident light in a different direction; and
an illumination optical system through which light emitted from a light source is emitted toward the optical modulator,
wherein the illumination optical system includes a lens array and a lens disposed in an order listed from the light source to the optical modulator,
wherein the illumination optical system includes a shielding part disposed closer to the light source than the lens,
wherein the shielding part is configured to shield light incident on an effective diameter of the lens, and
wherein, in a direction perpendicular to an optical axis of the light emitted from the light source, the optical axis of the light emitted from the light source is shifted from a center position of the effective diameter of the lens in an opposite direction with reference to the shielding part.

2. The optical system according to claim 1,
wherein a distance between the optical axis and the center position of the effective diameter of the lens in a direction perpendicular to the optical axis is controlled to be equal to or shorter than twice as much as a distance between the center position of the effective diameter of the lens and a center position of an effective diameter of the lens array, and
wherein the effective diameter of the lens array is reduced by length of a shielding field in which the light emitted from the light source is shielded by the shielding part.

3. The optical system according to claim 2,
wherein the distance between the optical axis and the center position of the effective diameter of the lens in the direction perpendicular to the optical axis is controlled to be equal to or shorter than the distance between the center position of the effective diameter of the lens and the center position of the effective diameter of the lens array from which the shielding field is excluded.

4. The optical system according to claim 1,
wherein the light source is movable, and a distance between the optical axis and the center position of the effective diameter of the lens changes in the direction perpendicular to the optical axis.

5. The optical system according to claim 1, further comprising:
a reflection optical system configured to reflect the light emitted from the light source toward the illumination optical system,
wherein the reflection optical system is movable, and a distance between the optical axis and the center position of the effective diameter of the lens changes in the direction perpendicular to the optical axis.

6. The optical system according to claim 1,
wherein the lens array includes first and second fly-eye lenses disposed separately from each other.

7. The optical system according to claim 1, further comprising:

an optical element through which the first exit light reflected by the optical modulation element in a first direction passes and then is guided to a projection surface.

8. The optical system according to claim 7, further comprising:
a projection optical system through which the first exit light that has passed through the optical element is projected onto the projection surface.

9. An image projection apparatus comprising:
the optical system according to claim 1,
wherein the optical system projects an image.

10. The optical system according to claim 1, further comprising:
a pair of prisms to, in conjunction with the optical modulation element, reflect and emit an incident light in the different direction.

11. The optical system according to claim 10, wherein each of the pair of prisms includes a total-reflection triangular prism.

12. The optical system according to claim 1, wherein the optical modulation element includes a digital micromirror device (DMD) that has a plurality of micromirrors driven according to input image data.

* * * * *